July 10, 1956     J. A. SIEFKER ET AL     2,754,211
PRODUCT DERIVED FROM DRIED BREWERS' GRAINS
Filed Aug. 6, 1954
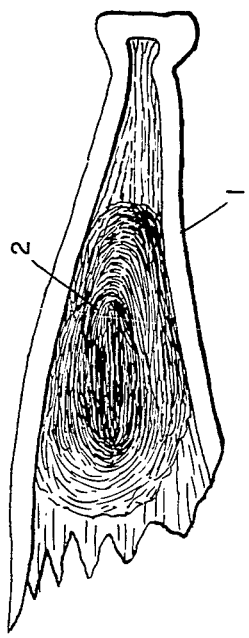
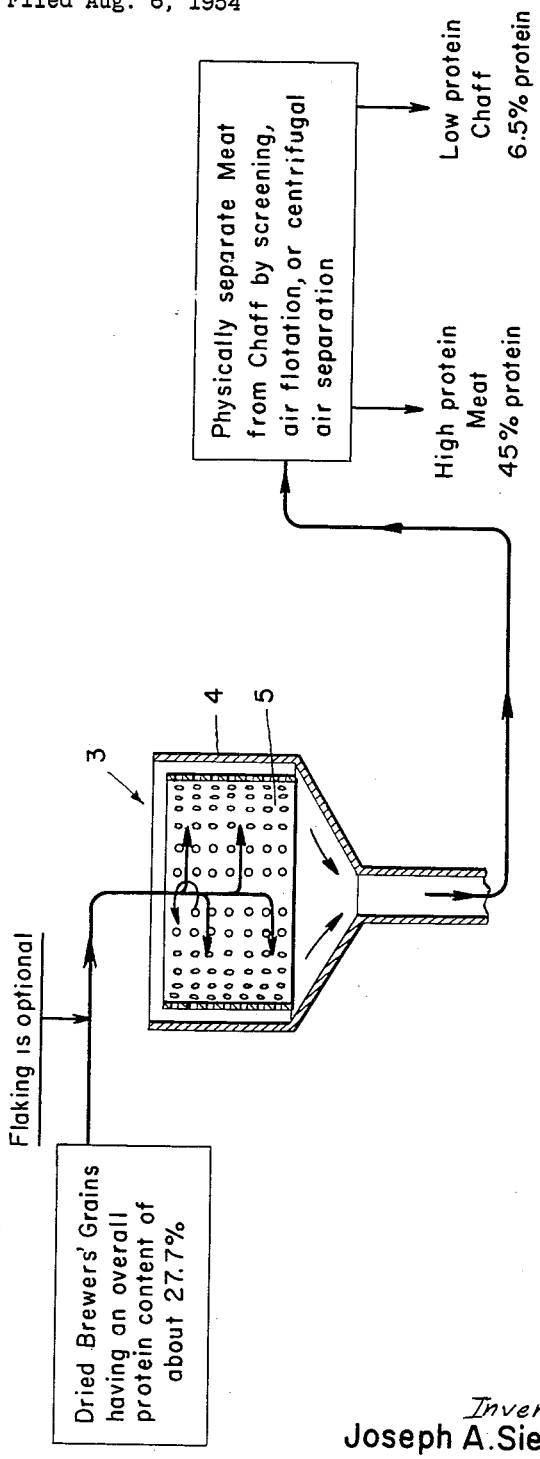
Inventors
Joseph A. Siefker
Jerome F. Brasch
By Gravely, Lieder, Woodruff & Wills
ATTYS.

United States Patent Office 2,754,211
Patented July 10, 1956

2,754,211

PRODUCT DERIVED FROM DRIED BREWERS' GRAINS

Joseph A. Siefker, Webster Groves, and Jerome F. Brasch, Hanley Hills, Mo., assignors to Anheuser-Busch, Inc., St. Louis, Mo., a corporation of Missouri Application August 6, 1954, Serial No. 448,301

2 Claims. (Cl. 99—14)

This invention relates to a new protein product derived from dried grains by the process disclosed in our copending application Serial No. 170,820, filed June 28, 1950, of which the present application is a continuation-in-part, and which copending application was allowed February 18, 1954, now Patent 2,691,590.

Brewers' grains are the residue of the malt and adjuncts used in brewing. During the mashing stage of brewing the starch of malt and the adjuncts such as corn grits and rice is converted to a soluble fermentable mixture of carbohydrates. These are separated by a straining operation known as lautering, and the residue when dewatered and dried is dried brewers' grains, a product containing substantially all the original constituents of the malt and adjuncts except the starch, small portions of water soluble materials, and small portions of the protein fraction. Dried brewers' grains are usually sold as animal feed and especially feed for ruminants since the high fiber content renders it of less value to other animals.

An object of this invention is to provide a derivative from dried brewers' grains in which the fiber content has been reduced to a level at which its use can be extended to non-ruminant animal nutrition and, in a highly refined state, to human nutrition. It is well-known that the high fiber content of dried brewers' grains limits its value as a feed, restricting its use as a feed for animals that can tolerate a high fiber content in their feed. Similarly, it is agreed that if the fiber content could be reduced, dried brewers' grains might serve as a high grade feed or feed ingredient for say, dogs, chicks, pigs, etc., and under favorable circumstances, when the fiber content has been drastically reduced, it might serve as a low fiber protein concentrate for use in human nutrition. In our process for the production of the product, the subject of this invention, such drastic reduction of fiber content has been attained, and thus a useful and hitherto unattainable high protein concentrate is available from dried brewers' grains. In the same process it may be desirable not to reduce the fiber content so drastically, thereby enriching the protein content to a lesser extent, thus providing a concentrate which, though no longer desirable for human nutrition, will still serve adequately in the diets of animals that can not tolerate the unprocessed grains.

Another object of the present invention is to produce as an article of commerce a valuable food product, having a biological value of 87 to 88% of casein, plus or minus 5%, and a protein efficiency of about 1.6, which compares favorably in these respects with the best cereal proteins known, thereby providing a valuable commercial food product separated from dried brewers' grains without materially decreasing the commercial value of the residue.

Still another object of this invention is to produce a new high protein food ingredient for chickens and dogs, comparing faborably in many respects with the best cereal proteins known, from dried brewers' grains whose average protein content is too low and fiber content too high for those types of food.

The process by which the product of the present application is obtained comprises detaching the meat portion of the dried brewers' grain from the chaff portion thereof and separating the two detached portions.

The invention of this application consists in the products produced in accordance with the herein described process, reference being had in connection therewith to the accompanying drawings wherein:

Fig. 1 is a typical enlarged particle of dried brewers' grains, and

Fig. 2 is a diagrammatic view showing the steps of a simplified form of this process.

Brewers' dried grains result from the brewing operation in the process for making beer in the following general way. Malt, which is barley that has been steeped in water and allowed to germinate and subsequently dried, is coarsely ground and suspended in water to form what is called a mash and then heated accordingly to a predetermined schedule to a maximum of about 75° C. During the heating period, the diastatic enzymes in the malt solubilize the starch in the malt as well as the starch in other cereals that may have been added and which are referred to as adjuncts, leaving behind in the undissolved state most of the protein, husks and fatty material of the malt and adjuncts. This undissolved material is removed, washed free of soluble matter, dewatered and dried in appropriate drying equipment. The dried product so obtained is referred to as dried brewers' grains, a representative particle of which is shown on an enlarged scale in Fig. 1 of the drawings.

In the process for producing the protein product, the subject of this invention, brewers' dried grains as received are directed into and through a suitable mill to detach the chaff portion or husks from the concentrated protein and fatty material, sometimes referred to as the meat portion, reducing the particle size of the husks to a lesser degree than meat portion, thus making possible the separation of the husks from the protein and fat portion in subsequent operations. This subsequent classification or separation is effected either by a screening operation or by a winnowing device such as an air flotation table or by a combination of both operations. It is understood that separation of the protein from the fibrous material is not complete. In general, three fractions are obtained. One fraction, the meat portion, constituting between 7 and 20% of the total, is rich in protein and fat and low in fiber; another fraction, the husk is relatively free from protein and high in fiber; and a large fraction contains protein in nearly the same proportion as initially.

The process may therefore be broken down into the following steps:

Preparation of the grains

This will usually include either flaking, which means flattening the grains, preferably by smooth or corrugated rolls, so that they will have a larger surface area, or extra drying. Whether either is necessary depends mainly on the condition of the grains as received. This step may be eliminated by making certain changes in a subsequent operation; for example, the effect of varying moisture contents of the grains may be compensated for by using a different size screen in the classification operation.

Detachment of the proteinaceous material from the chaff

For this step a process is required in which enough action is used to loosen the proteinaceous material from the chaff, but the action must not be so strong nor of such a nature as to break up the chaff. It has been found unexpectedly that an impact type mill 3 serves very well for this purpose, although there may be other types of mills which may serve satisfactorily. The nature of the impact surface 4, the speed of the mill, the moisture content, the gap between rotor and liner, the rate of feed to the mill and other physical conditions play a role in achieving the desired final product. An impact mill with a 15-inch corrugated liner or impact surface 4 with corrugations sloping 20° to the right from vertical and a rotor 5 of 14¾ inches operating at 3500 R. P. M. in the direction opposite to that recommended by the manufacturer, that is, clockwise as viewed from above, gives satisfactory results. It has been found that with a given mill the yield of the desired product is inversely a function of the moisture of the grains, and that flaking prior to milling tends to increase the yield. It has also been found that the yield of the desired product is a function of the rate of feed of the grains to the mill.

*Classification of the high protein fraction from the chaff and middling fractions*

Centrifugal air separation, air flotation, screening, or any combination of these operations may be employed for physically separating the meat from the chaff.

The high protein product derived from brewers' dried grains in the manner described comprises 7 to 20% of the brewers' dried grains processed, and contains approximately 45% protein, 8 to 10% fat, has a biological value of 87 to 88% of casein, plus or minus 5%, and a protein efficiency of about 1.6, and will maintain adult rats when no other protein is included in their diets. This product is a practical and useful feed or food. High protein products containing approximately 60% protein have been obtained with the process but the yield is lower.

The following chemical analysis of the proteinaceous or meat portion of the dried brewers' grain, the subject of this invention, is typical:

| | Percent |
|---|---|
| Protein _____ at least | 45 |
| Ash _____ | 3.0 |
| Moisture _____ | 8–10 |
| Crude fiber _____ | 5– 6 |
| Fat _____ | 8–10 |
| Nitrogen-free extract _____ | 33–26 |
| Carbohydrate _____ | 32–38 |

The following is a typical analysis of brewers' dried grains:

| | Average, percent | Range, percent |
|---|---|---|
| Protein | 27.71 | 22.0–32 |
| Ash | 3.73 | 3.4– 5.2 |
| Moisture | 10.86 | 8.0–14.0 |
| Crude fiber | 15.32 | 12.5–18.0 |
| Fat | 6.87 | 5.0– 8.6 |
| Nitrogen-free extract | 35.88 | 30.0–39.5 |
| Carbohydrate | 51.20 | 46.0–56.0 |

While the composition of our product as set forth in the table is typical, we do not wish to be restricted to products of this composition for, as mentioned before, under suitable conditions products with a protein content of 60% have been obtained. Similarly, products lower in protein content are obtained with less drastic classifying arrangements. This invention relates to a series of products varying in protein content from a practical maximum of about 60% to a minimum of about 35%, and any and all products within these limits, and relates particularly to a product having about 45% protein (total nitrogen x 6.25).

As examples of how our products are obtained, we set down the following three descriptions of our process:

*Example 1.*—Dried brewers' grains as received containing about 5 to 10% moisture and about 27–28% protein (total nitrogen x 6.25, as is basis) were fed into an impact mill of the type described and which is known in the trade as an "Entoleter." Dried brewers' grains containing 7% moisture and 27.7% protein were fed into the impact mill at a rate of 360 pounds per hour. The grains from this mill were then fed at a rate of 250 pounds per hour to a gyrowhip type sifter containing four 100-mesh screens having openings of .0055 inches. These screens each were one square foot in area and were used in series so that the grains which did not pass through the top screen were resifted on the second screen and so forth. The yield of the —100 mesh fraction was 11.4% and the protein content (total nitrogen x 6.25, as is basis) was 45.2%. The yield of the +100 mesh fraction was 88.6% and its protein content was 25.5%, which is suitable for feed in a mixed dairy cattle ration.

*Example 2.*—Dried brewers' grains as received containing about 5 to 10% moisture and about 27 to 28% protein were fed into the impact mill hereinbefore described at a rate of 360 pounds per hour. The grist was then subjected to several particle size separations by screening, which may be combined into one operation, and all but the finest fraction was processed on an air table. The purpose of the air table was to separate the higher proteinaceous material from the higher chaff material by virtue of their differences in specific gravity, the higher proteinaceous material being heavier.

The grist from the mill was fed at a rate of 250 pounds per hour to a gyro-whip type sifter containing four 100 mesh screens having openings of .0055 inch. These screens each were one square foot in area and were used in series so that the grains which did not pass through the top screen were resifted on the second screen, and so forth. The yield of the —100 mesh fraction was 11.4% and the protein content was 45.2%. The yield of the +100 mesh fraction was 88.6%. When the +100 mesh fraction was resifted on the same gyro-rotary sifter described above using two 40 mesh screens having openings of .0165 inch in series over two 20 mesh screens having openings of .0360 inch in series, three fractions were obtained: namely, +20 mesh, —20+40 mesh, and —40+100 mesh. The yields, based on the original product, of these three fractions are 38.2%, 29.0% and 21.4%, respectively. The —40+100 mesh fraction was then processed on an air table which comprises a vibrating table having both a lateral and end raise. Air is blown through a fine mesh bed so that when the product to be separated is fed to the low end of the table the action is such that the various components separate and the heavy fractions vibrate to the far end of the table. By carefully adjusting the air flow, vibratiang speed, lateral and end angles, rate of feed and other physical characteristics, the best separation can be observed visually. The yield of material having a protein content of 45.0% or more was 6.6%. If the remaining fractions were combined, the protein content would be 23.9%, which is considerably lower than the original 27.7% of dried brewers' grains. In order to raise the protein of the remaining feed fraction from 23.9 to 27.7%, the +20 mesh fraction was processed on an air table of the type previously described. A fraction was separated on the light end of the table having a low protein content of 6.5% with a yield of 14.6%. Thus, we obtained from these processes three products in yields of 18.5%, 67.4% and 14.6% with protein contents of 45.1%, 27.7% and 6.5%, respectively. It can be seen from this example that use of the air table improved the yield of the 45.0% protein fraction from 11.4% as found in Example 1 to 18.0% and also permitted the removal of a very low protein and very high fiber fraction which has little feed value, so that the remainder of the grains have essentially the same feed value as the original starting material.

*Example 3.*—Dried brewers' grains as received containing about 5 to 10% moisture and about 27 to 28% protein were fed into the impact mill hereinbefore described at a rate of 360 pounds per hour. The grist was subjected to several particle size separations by screening, which may be combined into one operation, and all but the finest fraction was processed on an air table. The purpose of the air table was to separate the higher proteinaceous material from the higher chaff material by virtue of their differences in specific gravity, the higher proteinaceous material being heavier. The grist from the mill was fed to a vibrating single deck sifter with a 100 mesh screen having an opening of .0059 inch. The yield of the —100 mesh fraction was 4.5% and the protein content thereof was 47.0%. When the +100 mesh fraction was resifted on the same vibrating single deck sifter using a 40 mesh screen having an opening of .0164 inch and in a subsequent operation using a 20 mesh screen having an opening of .0331 inch, three fractions were obtained: namely, +20 mesh, —20+40 mesh, and —40+100 mesh. The yields of these three fractions, based on the original product, were 34.0%, 33.0% and 28.5%, respectively. These three fractions were then individually passed over the air table and combined in such a manner as to produce four products: namely, a high protein product (46.5%), an intermediate protein product (35.7%) suitable for special feeds where a higher protein and lower fiber are required than for cattle feed, a cattle feed product with the same protein content as the original grains, and a low protein (7.3%) high fiber (27%) product. The yields on these products were 11.0%, 21.1%, 50.2% and 17.7%, respectively.

The details of this classification are hereinafter described. The +20 mesh fraction was passed over the air table and a light fraction in yield of 13.9% (based on original grains) having a protein content of 6.5% was separated. The remainder of the grains from this air tabling was combined with subsequent fractions to form the cattle feed fraction. The +20—40 mesh fraction was passed over the air table and three products were separated: namely, a light fraction in yield of 3.8% having a protein content of 8.8%, a heavy fraction in yield of 12.5% with a protein content of 36.2%, and a middling fraction in yield of 16.7%. The light fraction was combined with the light fraction from the +20 mesh air tabling to form the low protein product. The heavy fraction was combined with a subsequent fraction to form the intermediate protein product. The middling fraction was combined with other fractions to form the cattle feed fraction. The —40+100 mesh fraction was passed over the air table and three fractions were separated: namely, a light fraction in yield of 13.4%, a heavy fraction in yield of 6.5% with a protein content of 46.8%, and a middling fraction in yield of 8.6%, with a protein content of 34.6%. The light fraction was combined with other fractions to form the cattle feed, the heavy fraction was combined with the —100 mesh fraction from the original screening to form the high protein product, and the middling fraction was combined with a previously mentioned fraction to form the intermediate protein product.

It is to be noted that the process is versatile—that by varying the operating conditions, the yields or the protein contents of the several products may be easily changed.

While the above examples are clear and precise descriptions of several representative processes in which the products may be obtained, it is to be understood that we do not wish to be limited to the conditions of the examples except as defined in the claims. We fully realize that by varying any of the operating conditions or state of the grains before or during processing, larger yields or higher protein concentrations, or different products are possible.

As hereinbefore indicated, if 100 units of dried brewers' grains are subjected to this process, approximately 7 to 20 units will be broken down substantially into a high protein meat portion having a 45% protein content and 13 to 17 units into a chaff portion having a 6.5% protein content. The high protein meat portion can be used as a high protein food and can even be used for human consumption. The low protein chaff portion could possibly be used for a filler, fertilizer, insulation, paper or in the production of furfural. If the 7 to 20 units broken down are not subjected to a complete classification, then intermediate products containing 35 to 45% protein can be obtained. The 40% protein products are useful for dog food and the 35% protein products are useful as a chicken feed.

The product comprising the subject of this invention is clearly distinct from the malt and adjuncts from which it is derived. It is not malt flour in that all, or as nearly as is practical, the starch has been removed from the malt in the mashing process. It has lost all or substantially all the diastatic power originally present in the malt during the drying process. It is a high protein food stuff derived from cereal sources, principally from barley, useful in the nutrition of animals that cannot tolerate a feed high in fiber content and in human nutrition. The quality of the protein in brewers' grains has long been recognized, but it was the high fiber content that prevented its use for the purposes indicated.

The product comprising the subject of this invention is distinct from analogous products obtainable from distillery slops partly because of the difference in the materials entering the distilling process and the differences in the distillery operations, but particularly because such distillery products contain yeast. Brewers' grains are eliminated at a stage prior to the seeding of the wort with yeast (cf. U. S. #2,070,285), and therefore do not contain yeast.

As hereinbefore set forth, the product of the present invention is not malt flour and to illustrate in what manner malt flour differs from the product of this invention, the following analysis is given of malt or flour made therefrom, which would be identical, as set forth in "The Technology of Bread Making" by William Jago published in 1921:

|  | Percent |
|---|---|
| Starch | 44–50 |
| Sugars | 9–16 |
| Unfermentable carbohydrates (not dextrin) | 5–7 |
| Cellulose | 10–12 |
| Soluble protein | 3–4.5 |
| Insoluble protein | 8–10 |
| Fat | 1.5–2 |
| Ash | 1.9–2.6 |
| Water | 2.5–7 |

For comparison purposes, a laboratory analysis was made of malt flour and the new product which is the subject matter of the present invention. The results were as follows:

|  | Malt Flour | | New Product | |
|---|---|---|---|---|
|  | As Is, percent | Dry Basis, percent | As Is, percent | Dry Basis, percent |
| Moisture | 5.60 |  | 6.60 |  |
| Protein | 11.20 | 11.86 | 47.69 | 51.06 |
| Ash | 1.50 | 1.59 | 2.95 | 3.16 |
| Oil | 1.50 | 1.59 | 5.82 | 6.23 |
| Crude fiber | 1.64 | 1.74 | 3.72 | 3.98 |
| Nitrogen free extract | 78.56 | 83.22 | 33.21 | 35.56 |
| Carbohydrates | 80.20 | 84.96 | 36.93 | 39.54 |
| Available extract (including starch) | 82.60 | 87.40 | 15.00 | 16.10 |
| Soluble extract | 81.20 | 86.90 | 6.10 | 6.50 |
| Cold water extract | 21.40 | 22.70 | 5.30 | 5.60 |

We claim:

1. A finely divided low fiber high protein content food supplement suitable for use in human nutrition derived from dried brewers' grains comprising at least 45% protein, approximately 8 to 10% fat, with an approximate biological value of 82 to 93% and having a fineness of the order of 100 mesh and which is substantially free of starch.

2. A finely divided low fiber high protein content food supplement suitable for use in human nutrition derived from dried brewers' grains comprising at least 45% protein, approximately 8 to 10% fat, with an approximate biological value of 82 to 93% and having a fineness of the order of 100 mesh and which is substantially free of starch and substantially devoid of all diastatic power.

References Cited in the file of this patent

UNITED STATES PATENTS

| | | |
|---|---|---|
| 453,364 | Taylor | June 2, 1891 |
| 949,581 | Kubessa | Feb. 15, 1910 |

OTHER REFERENCES

Winton, vol. I, Structure and Composition of Foods, Wiley, 1932, pages 276, 290, 291.

The Practical Brewer, published by Master Brewers' Ass'n of America, 1946, page 80.